(12) United States Patent
Palazzo et al.

(10) Patent No.: US 10,497,937 B2
(45) Date of Patent: Dec. 3, 2019

(54) METHOD FOR PROVIDING A HIGH CAPACITY CATHODE MATERIAL WITH IMPROVED RATE CAPABILITY PERFORMANCE

(71) Applicant: Greatbatch Ltd., Clarence, NY (US)

(72) Inventors: Marcus J. Palazzo, Wheatfield, NY (US); Ashish Shah, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 202 days.

(21) Appl. No.: 15/807,633

(22) Filed: Nov. 9, 2017

(65) Prior Publication Data
US 2018/0069241 A1 Mar. 8, 2018

Related U.S. Application Data

(63) Continuation-in-part of application No. 14/599,915, filed on Jan. 19, 2015, now abandoned.
(Continued)

(51) Int. Cl.
| | |
|---|---|
| *H01M 4/52* | (2010.01) |
| *H01M 4/58* | (2010.01) |
| *H01M 4/62* | (2006.01) |
| *C01G 51/00* | (2006.01) |
| *H01M 4/136* | (2010.01) |

(Continued)

(52) U.S. Cl.
CPC ........ *H01M 4/5815* (2013.01); *C01G 51/006* (2013.01); *C01G 51/30* (2013.01); *H01M 4/136* (2013.01); *H01M 4/623* (2013.01); *H01M 4/625* (2013.01); *C01P 2002/72* (2013.01); *C01P 2002/85* (2013.01); *C01P 2004/03* (2013.01); *H01M 10/052* (2013.01); *H01M 2004/028* (2013.01); *H01M 2220/30* (2013.01)

(58) Field of Classification Search
CPC .......... H01M 4/136; H01M 4/52; H01M 4/58
See application file for complete search history.

(56) References Cited

U.S. PATENT DOCUMENTS

| | | | |
|---|---|---|---|
| 4,390,604 A | 6/1983 | Evans et al. | |
| 5,571,640 A | 11/1996 | Takeuchi et al. | |

(Continued)

FOREIGN PATENT DOCUMENTS

| | | |
|---|---|---|
| CN | 1843941 | 10/2006 |
| CN | 101823769 | 9/2010 |

(Continued)

OTHER PUBLICATIONS

Extended European Search Report, Application No. 15151682.0, dated May 26, 2015.
(Continued)

*Primary Examiner* — Christina Chern
(74) *Attorney, Agent, or Firm* — Michael F. Scalise

(57) ABSTRACT

The present invention related to an electrochemical cell comprising an anode of a Group IA metal and a cathode of a composite material prepared from an aqueous mixture of iron sulfate, cobalt sulfate and sulfur. The cathode material of the present invention provides an increased rate pulse performance compared to iron disulfide cathode material. This makes the cathode material of the present invention particularly useful for implantable medical applications.

20 Claims, 6 Drawing Sheets

Related U.S. Application Data

(60) Provisional application No. 61/928,768, filed on Jan. 17, 2014.

(51) Int. Cl.
*H01M 4/02* (2006.01)
*H01M 10/052* (2010.01)

(56) References Cited

U.S. PATENT DOCUMENTS

| | | | |
|---|---|---|---|
| 5,639,577 | A | 6/1997 | Takeuchi et al. |
| 7,939,199 | B1 | 5/2011 | Gan et al. |
| 8,440,342 | B2 | 5/2013 | Swift et al. |
| 2001/0008729 | A1* | 7/2001 | Ogasawara ........... H01M 4/366 429/223 |
| 2002/0094480 | A1 | 7/2002 | Gan et al. |
| 2011/0223481 | A1 | 9/2011 | Takeuchi et al. |
| 2013/0157135 | A1 | 6/2013 | Zhou et al. |

FOREIGN PATENT DOCUMENTS

| | | |
|---|---|---|
| EP | 2400585 | 12/2011 |
| WO | 2010027720 | 3/2010 |

OTHER PUBLICATIONS

Thermal Battery Materials—CoS2(Cobalt Sulphur) With Good Performance Linyi Gelon Lib Co.,2 Ltd, Http://libgroup.en.alibaba.com/product/971940585-218720361/thermal battery materials CoS2 Cobalt Sulphur with high purity.html, 1999-2012, 1-4.

Awano, et al., "Li/Fe1-xCoxS2 System Thermal Battery Performance", Matsuhita Battery Ind. Co. Ltd. Osaka, Japan, 1992.

Dallek, et al., "Evaluation of Transition Metal Sulfide Cathode Materials for Thermal Batteries", Jun. 1994, 329-332.

* cited by examiner

METHOD FOR PROVIDING A HIGH CAPACITY CATHODE MATERIAL WITH IMPROVED RATE CAPABILITY PERFORMANCE

CROSS-REFERENCE TO RELATED APPLICATION

This application is a continuation-in-part of U.S. application Ser. No. 14/599,915, filed on Jan. 19, 2015, now abandoned, which claims priority to U.S. provisional application Ser. No. 61/928,768, filed Jan. 17, 2014.

TECHNICAL FIELD

This invention relates to the art of electrochemical cells, and more particularly, to a new and improved electrochemical cell, and a cathode therefore. The cell comprises a Group IA anode and a new composite metal cathode material. Still more particularly, the present invention is directed to the preparation of iron-cobalt-disulfide having the stoichiometric formula of $Fe_{1-x}Co_xS_2$.

BACKGROUND OF THE INVENTION

Electrochemical cells provide electrical energy that powers a host of electronic devices such as external and implantable medical devices. Among these many medical devices powered by electrochemical cells are external medical drills and implantable cardiac defibrillators. Such medical devices generally require the delivery of a significant amount of current in a relatively short duration of time. Thus, these devices typically require the use of electrochemical cells that comprise an increased delivery capacity and an increased rate of charge delivery. As defined herein, "delivery capacity" is the maximum amount of electrical current that can be drawn from a cell under a specific set of conditions. The terms, "rate of charge delivery" and "rate capability" are defined herein as the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry.

Cathode chemistries such as carbon monofluoride (CFx) have been developed to provide increased discharge capacities that meet the power demands of external and implantable medical devices. CFx cathode material is generally known to have a discharge capacity of about 875 mAh/g, which is well suited for powering implantable medical devices over long periods of time. However, electrochemical cells constructed with cathodes comprised of carbon monofluoride are generally considered to exhibit a relatively "low" rate capability. For example, electrochemical cells constructed with lithium anodes and CFx cathodes typically exhibit rate capabilities from about 0.5 mA/cm² to about 3 mA/cm². As such, electrochemical cells constructed with Li/CFx couples are generally well suited for powering electrical devices, like an implantable cardiac pacemaker that are powered over long periods of time at a relatively low rate capability.

In contrast, electrochemical cells constructed with lithium anodes and cathodes comprising silver vanadium oxide (SVO) are generally considered to exhibit a relatively "high" rate capability. Lithium cells constructed with SVO cathodes, in contrast to CFx cathodes, generally exhibit rate capabilities that range from about 25 mA/cm² to about 35 mA/cm². As such, lithium electrochemical cells constructed with cathodes comprised of SVO are generally well suited to power devices that require an increased rate capability, such as an implantable cardiac defibrillator. However, lithium cells constructed with cathodes comprising SVO typically have a lower discharge capacity as compared to those having cathodes comprising CFx. Silver vanadium oxide cathode material is generally known to have a discharge capacity of about 315 mAh/g, which is significantly less than the discharge capacity of 875 mAh/g for CFx as previously discussed. Therefore, what is desired is a cathode material and electrochemical cell thereof that comprises a "high" discharge capacity in addition to an increased rate capability. Such an electrochemical cell would be well suited for powering additional electronic devices that require an increased charge capacity with an increased discharge rate.

The applicants, therefore, have developed a new iron cobalt disulfide cathode material formulation and cathode thereof that provides a lithium electrochemical cell with a discharge capacity of between about 700 mAh/g to about 850 mAh/g and an increased rate capability of between about 15 mA/cm² to about 20 mA/cm². Thus, a cathode composed of the iron cobalt disulfide material of the present invention when constructed within an electrochemical cell having a lithium anode is well suited for powering a variety of electrical devices that require a "high" discharge capacity with an increased rate capability.

The use of iron disulfide as a cathode material is generally known. In particular, Awano et al. in "Li/$Fe_{1-x}Co_xS_2$ System Thermal Battery Performance" *Power Sources Symposium* 1992, p. 219-222 disclose an iron cobalt disulfide cathode material having a general formula of $Fe_{1-x}Co_xS_2$, wherein x≤0.4. The Awano et al. material is fabricated by mixing dry iron powder, metal cobalt powder and sulfur together. This is followed by subjecting the powder mixture to a temperature of between 350° C. to 550° C. in an argon gas environment. This method is similar to processes commonly used in the industry where metal powders are combined and subsequently heated under a gaseous flow.

In contrast, the iron cobalt disulfide cathode material of the present invention is fabricated using a hydrothermal process in which iron sulfate, cobalt sulfate, sulfur are mixed in an aqueous mixture at a temperature of about a range from about 100° C. to 300° C., preferably about 200° C. As a true hydrothermal process, the synthetic method of the present invention uses metal salts that are dissolved and reacted in a liquid phase rendering a unique chemical structure. The reaction can therefore take place at much lower temperatures and without the need of gas flow, as is required by the prior art, for example, the Awano et al. process. The present invention process has the advantage of producing a very homogeneous product without the cost and complexity of the exemplary Awano et al. commercial technology.

In addition, the Awano et al. cathode material comprises a chemical structure that is different than the cathode material of the present invention. Specifically, the iron cobalt disulfide material of the present invention comprises an increased amount of cobalt as compared to Awano et al. Furthermore, the lattice structure of the iron cobalt disulfide material of the present invention decreases in size with an increasing amount of cobalt. In contrast, the Awano et al. iron cobalt disulfide material comprises a lattice structure that increases in size with increasing amounts of cobalt.

These chemical and structural differences between the iron cobalt disulfide cathode materials of Awano et al. and that of the present invention manifest themselves in electrical performance differences when constructed within a lithium electrochemical cell. For example, lithium cells constructed with the Awano et al. cathode material exhibit an increased background voltage as compared to lithium cells constructed with the cathode material of the present invention. Thus, as will be discussed in more detail, the iron cobalt disulfide cathode material of the present invention comprises a unique chemical structure that provides a lithium electrochemical cell with electrical properties that are well suited to power a variety of electrical devices that require an increased discharge capacity with increased rate capability.

SUMMARY OF THE INVENTION

The present invention relates to an electrochemical cell comprising an anode of a Group IA metal and a cathode of a composite material prepared from a combination of metal salts. Specifically, the present invention is of an electrochemical cell having a lithium anode and iron cobalt disulfide cathode material that comprises iron sulfate, cobalt sulfate and sulfur. A sodium sulfate reactant, such as sodium thiosulfate pentahydrate ($Na_2S_2O_3 \cdot 5H_2O$), may be added to aid in the reaction that produces the iron cobalt disulfide cathode material formulation of the present invention. The cathode material is preferably fabricated in a hydrothermal process in which the metal salts, sodium sulfate and sulfur are combined in an aqueous mixture with applied heat.

The cathode material of the present invention provides a cathode and an electrochemical cell thereof having an increased electrical capacity and improved rate capability. The iron cobalt disulfide cathode material of the present invention has been measured to exhibit an electrical capacity between about 700-850 mAh/g, thus making the cathode material a good candidate for use in electrochemical cells that are used in applications that demand high device longevity at an increased rate of charge delivery. A substantial increase in rate capability of the cathode material also lends itself to applications requiring higher pulse levels. In addition, the cathode material is more conducive to manufacturing as the material is more robust and its electrical properties are less affected by manufacturing process variations. The gains in electrical performance are due to the inherent material properties of the novel cathode material itself where additives or costly processing and design changes are not required to realize the electrical performance benefits.

DETAILED DESCRIPTION OF THE PREFERRED EMBODIMENTS

Figure 1:
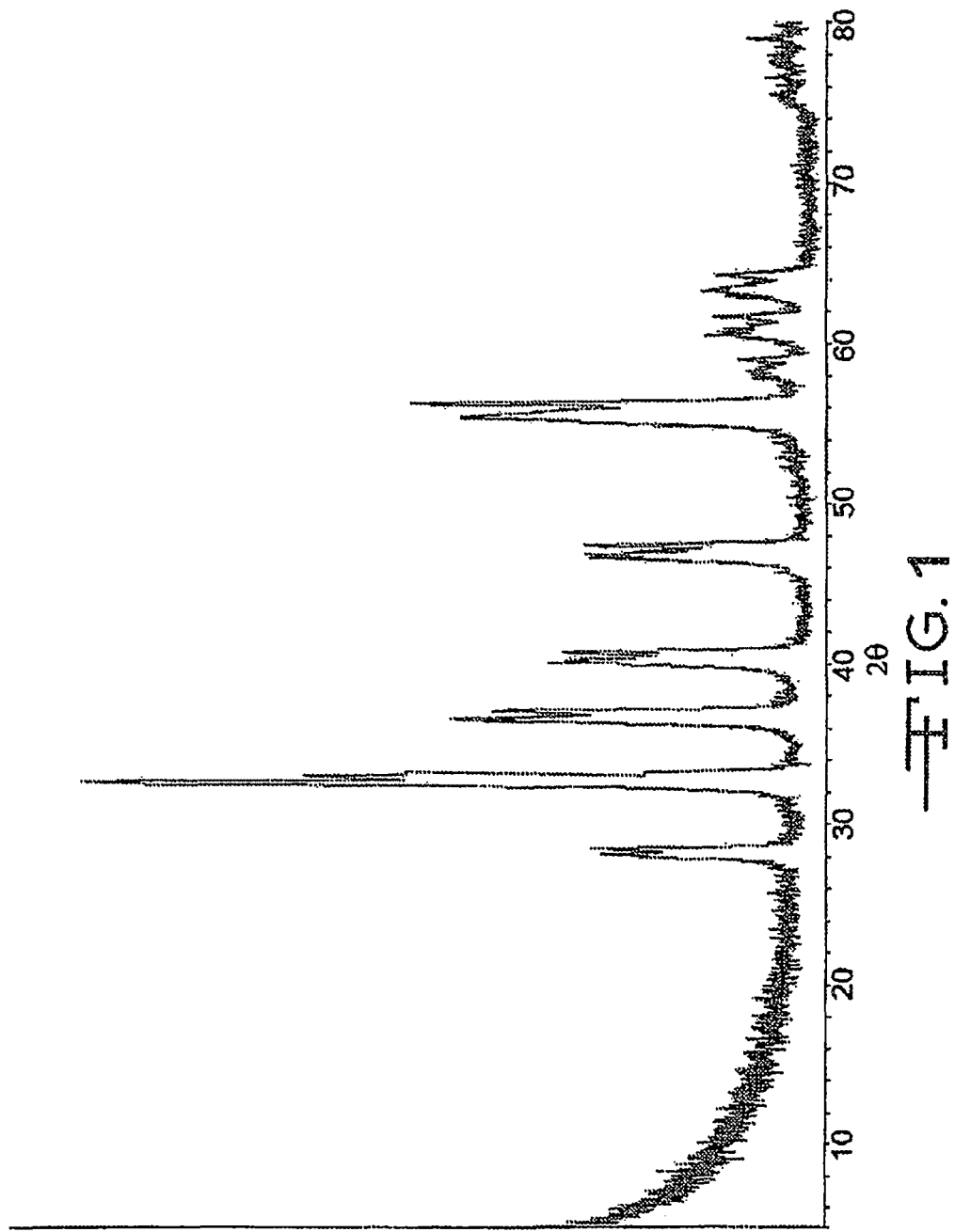
FIG. 1 illustrates an embodiment of an x-ray diffraction pattern of the $Fe_{0.2}Co_{0.8}S_2$ material formulation.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses.

In performing accelerated discharge testing of a cell, an exemplary pulse train may consist of one to four 5- to 20-second pulses ($23.2$ $mA/cm^2$) with about a 10 to 30 second rest, preferably about 15 second rest, between each pulse. A typically used range of current densities for lithium cells powering implantable medical devices is from about 15 $mA/cm^2$ to about 50 $mA/cm^2$, and more preferably from about 18 $mA/cm^2$ to about 35 $mA/cm^2$. Typically, a 10-second pulse is suitable for medical implantable applications. However, it could be significantly shorter or longer depending on the specific cell design and chemistry and the associated device energy requirements. Current densities are based on square centimeters of the cathode electrode.

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium.

The form of the anode may vary, but typically, the anode is a thin sheet or foil of the anode metal, pressed or rolled on a metallic anode current collector, i.e., preferably comprising nickel, to form an anode component. In the electrochemical cell of the present invention, the anode component has an extended tab or lead of the same metal as the anode current collector, i.e., preferably nickel, integrally formed therewith such as by welding and contacted by a weld to a cell case of conductive metal in a case-negative configuration. Alternatively, the anode may be formed in some other geometry, such as a bobbin shape, cylinder or pellet to allow an alternate low surface cell design.

The electrochemical cell of the present invention further comprises a cathode, and the electrochemical reaction at the cathode involves conversion of ions which migrate from the anode to the cathode into atomic or molecular forms. The cathode of the present invention, therefore, includes an electrically conductive composite cathode material that comprises elements of iron, cobalt, and sulfur resulting from the hydrothermal reaction of a mixture of a first metal salt comprising iron and a second metal salt comprising cobalt and sulfur.

The cathode material of this invention can be constructed by the chemical addition reaction, solid-state reaction or otherwise intimate contact of various combinations of metal sulfates, sulfides or oxides, preferably during thermal treatment, sol-gel formation, chemical vapor deposition or hydrothermal synthesis in mixed states. The materials thereby produced contain metals and oxides of the Groups IB, IIB, IIIB, IVB, VB, VIB, VIIB, and VIII which includes the noble metals and/or other oxide compounds. As defined herein, a solid state reaction is a chemical reaction in which two solid materials are fused together into one solid material through the application of heat over a prescribed period of time.

Cathode composites are prepared by thermally treating the first metal salt of iron sulfate with a mixture of the second metal salt of cobalt sulfate and sulfur in an aqueous solution. In a preferred embodiment, the respective hydrates of the first and second metal salts are combined in the aqueous mixture. More preferably the first metal salt of iron(II) sulfate hydrate ($FeSO_4.7H_2O$) is combined with the second metal salt of cobalt(II) sulfate hydrate ($CoSO_4.7H_2O$) and sulfur. These constituents are thoroughly mixed in deionized water and thereafter heat treated. Thus, the composite cathode material may be described as a metal-metal, metal salt matrix and the range of material composition found for $Fe_{1-x}Co_xS_2$ (FCS) is preferably about $x \geq 0.5$ and more preferably about $0.5 \leq x \leq 1.0$.

In addition a sodium salt reactant may be added to the aqueous admixture to aid in driving the hydrothermal reaction to form the iron cobalt disulfide material of the present invention. In a preferred embodiment, the reactant comprises a sodium sulfate salt. In a more preferred embodiment, the reactant comprises a hydrate of the sodium sulfate salt such as sodium thiosulfate pentahydrate ($Na_2S_2O_3.5H_2O$).

In addition to the preferred iron sulfate ($FeSO_4$), other first metal salts may comprise iron acetate ($Fe(C_2H_3O_2)_2$)) iron bromide ($FeBr_3$), iron perchlorate ($Fe(ClO_4)_2$), iron iodate ($FeI_2$), iron nitrate (($Fe(NO_3)_3$), iron oxalate ($Fe(C_2O_4)_3$), iron thiocyanate ($Fe(SCN)_3$), and respective hydrate forms thereof. Furthermore, in addition to the preferred cobalt sulfate ($CoSO_4$), other second metal salts may comprise cobalt acetate $Co(C_2H_3O_2)_2$, cobalt chloride ($CoCl_3$), cobalt chloride ($CoCl_2$), cobalt fluoride ($CoF_2$), cobalt iodate ($CoI_2$), cobalt thiocyanate ($Co(SCN)_2$), and respective hydrate forms thereof.

A typical form of FCS prepared from the above described starting materials is $Fe_{0.3}Co_{0.7}S_2$ or $Fe_{0.2}Co_{0.8}S_2$. FIG. 1 illustrates the x-ray diffraction pattern of the active cathode material formulation having the stoichiometry of $Fe_{0.2}Co_{0.8}S_2$. From the x-ray diffraction data, it was determined that the iron cobalt disulfide cathode material of the present invention comprises a cubic lattice structure having a unit cell dimension of between about 5.383 Å and 5.478 Å. The applicants have discovered that increasing the amount of cobalt decreases the size of the unit cell and thus, reduces the unit cell dimension.

Such composite materials as those described above may be pressed into a cathode pellet with the aid of a suitable binder material such as a fluoro-resin powder, preferably polytetrafluoroethylene (PTFE) powder, and a material having electronic conductive characteristics such as graphite and/or carbon black. In some cases, no binder material or electronic conductor material is required to provide a similarly suitable cathode body. Further, some of the cathode matrix samples may also be prepared by rolling, spreading or pressing a mixture of the material mentioned above onto a suitable current collector. Cathodes prepared as described above may be in the form of one or more plates operatively associated with at least one or more plates of anode material, or in the form of a strip wound with a corresponding strip of anode material in a structure similar to a "jellyroll".

For example, the cathode active material is preferably mixed with a binder material such as a powdered fluoropolymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 98 weight percent of the cathode active material.

A preferred method of cathode preparation is by contacting a blank cut from a free-standing sheet of cathode active material to a current collector. Blank preparation starts by taking granular cathode material, in this case the iron cobalt disulfide of the present invention, and adjusting its particle size and distribution to a useful range in an attrition or grinding step. These methods are further described in U.S. Pat. No. 6,566,007 to Takeuchi et al., which is assigned to the assignee of the present invention and incorporated herein by reference.

The exemplary cell of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, macroporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials suitable for the electrochemical cell of the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company, and polyvinylidene fluoride.

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention is preferably activated with a nonaqueous, ionically conductive electrolyte operatively associated with the anode and the cathode. The electrolyte serves as a medium for migration of ions between the anode and the cathode during electrochemical reactions of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The preferred electrolyte of the present invention comprises an inorganic salt having the general formula $MAF_6$ wherein M is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof. More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. Thus, in the case of an anode comprising lithium, the alkali metal salt of the electrolyte preferably comprises either lithium hexafluoroarsenate or lithium hexafluorophosphate dissolved in a 50/50 solvent mixture (by volume) of PC/DME. For a more detailed description of a nonaqueous electrolyte for use in the exemplary cell of the present invention, reference is made to U.S. Pat. No. 5,580,683, which is assigned to the assignee of the present invention and incorporated herein by reference. In the present invention, the preferred electrolyte for a Li/FCS cell is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The electrochemical cell of the present invention operates in the following manner. When the ionically conductive electrolyte becomes operatively associated with the anode and the cathode of the cell, an electrical potential difference is developed between terminals operatively connected to the anode and the cathode. During discharge, the electrochemical reaction at the anode includes oxidation to form metal ions and the electrochemical reaction at the cathode involves conversion of these ions which migrate from the anode into atomic or molecular forms. It is observed that the electrochemical cell of this invention has a wide operating temperature range of about −20° C. to +70° C. Advantages of the FCS cathode material according to the present invention include a high delivered capacity, an increased rate and reduced direct current resistance for increased rate applications.

The electrochemical cell according to the present invention is illustrated further by the following examples.

EXAMPLE I

Material Test Sample

A test sample of iron cobalt disulfide was synthesized via a solid-state hydrothermal reaction of commercially available iron(II) sulfate heptahydrate ($FeSO_4 \cdot _7H_2O$) mixed with cobalt(II) sulfate heptahydrate ($CoSO_4 \cdot _7H_2O$), sodium thiosulfate pentahydrate ($Na_2S_2O_3 \cdot 5H_2O$) and sulfur (S). Specifically, iron(II) sulfate heptahydrate ($FeSO_4 \cdot _7H_2O$) (10.75 g, 0.04 mol) was added to a mixture of cobalt(II) sulfate heptahydrate ($CoSO_4 \cdot _7H_2O$) (10.88 g, 0.04 mol), sodium thiosulfate pentahydrate ($Na_2S_2O_3 \cdot _5H_2O$) (19.20 g, 0.08 mol) and sulfur (S) (2.48 g, 0.08 mol). These powders were thoroughly mixed by hand such as with a mortar and pestle. Alternatively, an attrition ball mill may be used to thoroughly mix the powder components together. Once the powder components were mixed, about 400 ml of water was added to the mixture. The aqueous mixture was then subjected to a heat treatment whereby the mixture was heated to a range from about 100° C. to 300° C., preferably about 200° C. within ambient atmosphere conditions for about 48 hours, and mixed again. In a preferred embodiment, the aqueous mixture is placed in a sealed vessel that contains the hydrothermal reaction therewithin. The hydrothermal reaction that occurs is a result of mixing these powder components with water with applied heat and evolved gas from the chemical reaction. Sealing the reacting aqueous mixture within a vessel contains the evolved heat and pressure therewithin and contributes to the formation of the preferred iron cobalt disulfide material of the present invention. Upon cooling, the material was centrifuged, rinsed with de-ionized water, and dried.

Figure 2:
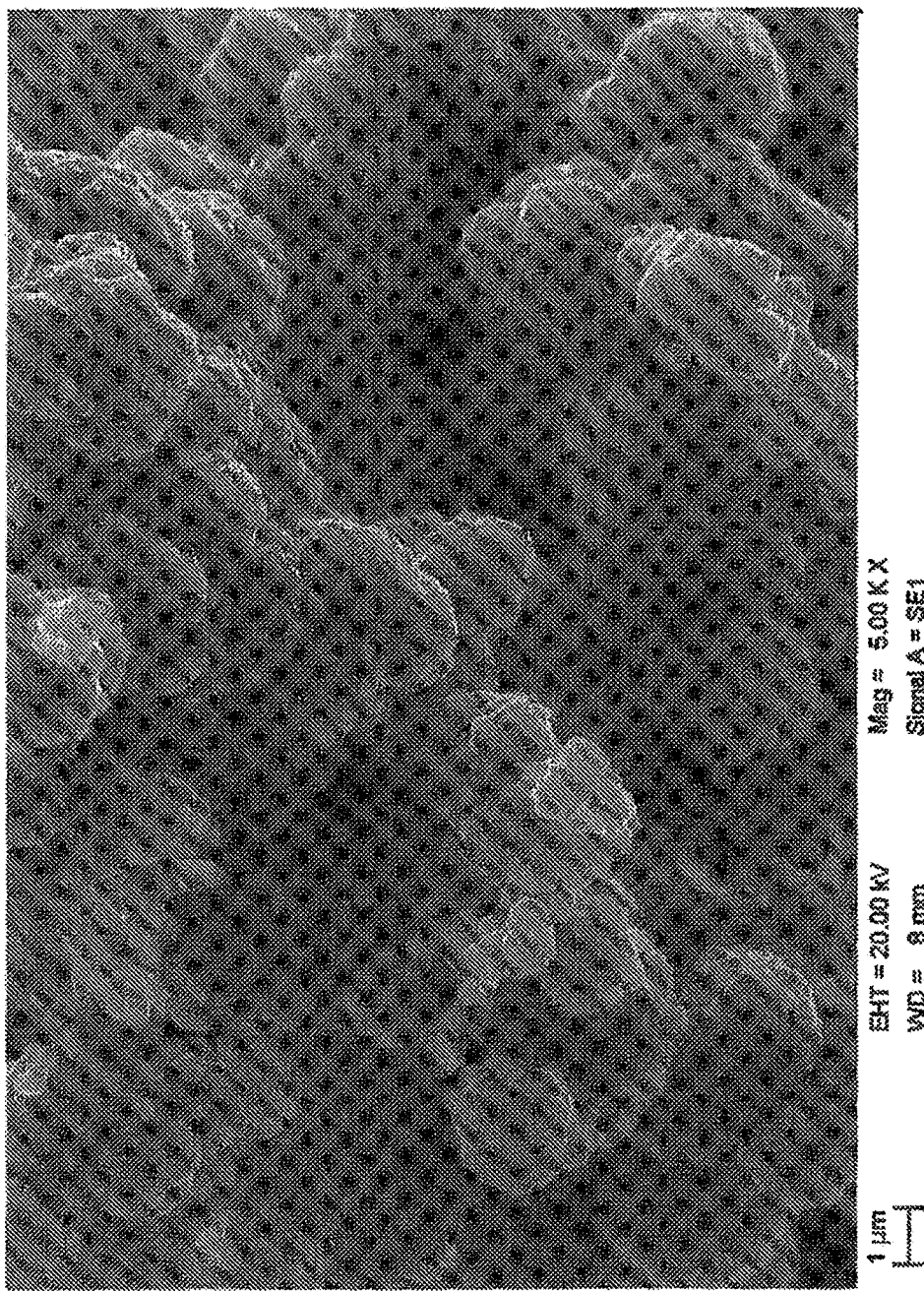
FIG. 2 is a scanning electron microscope image of the $Fe_{0.2}Co_{0.8}S_2$ material formulation.
Figure 3:
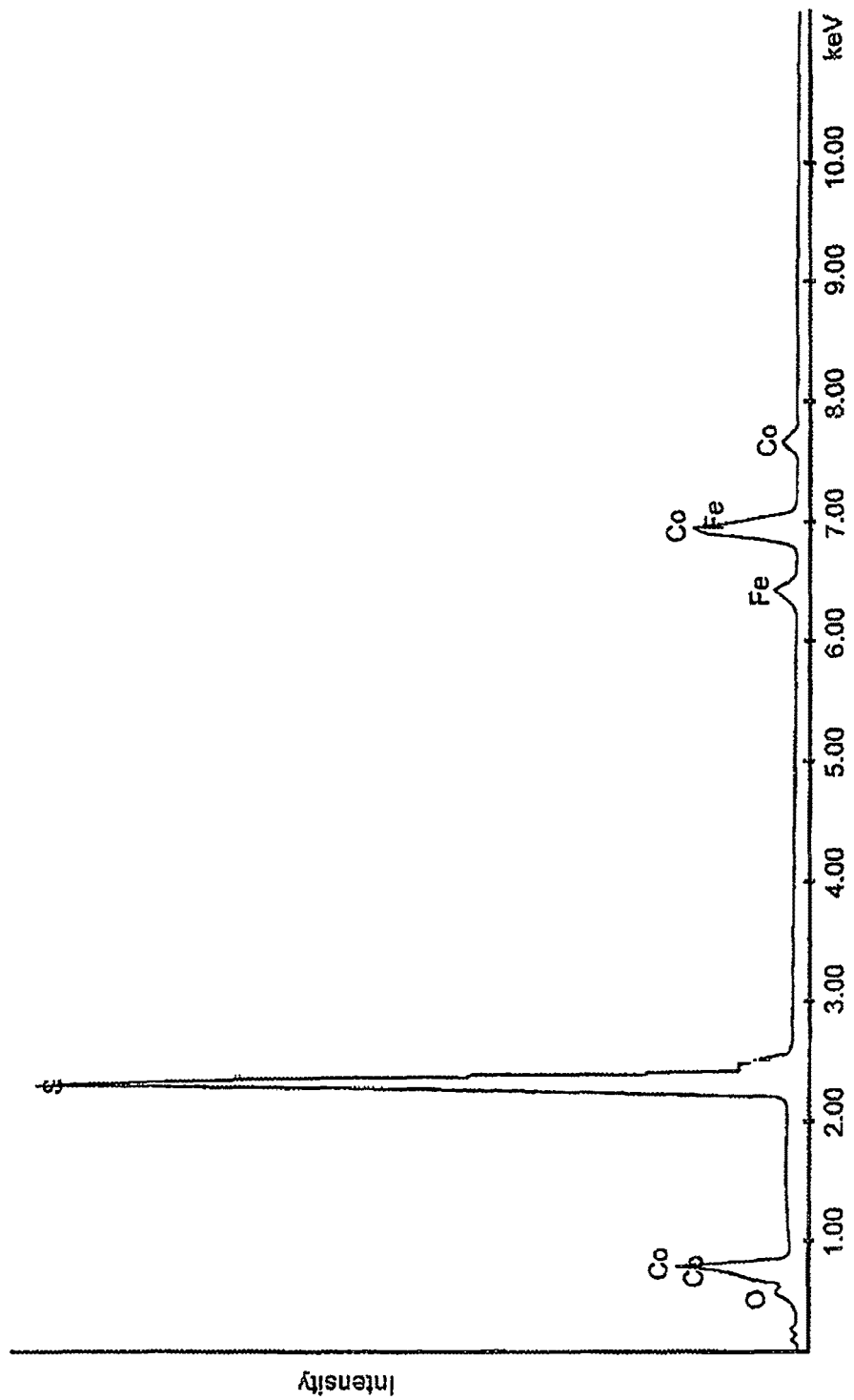
FIG. 3 shows an embodiment of an energy dispersive spectroscopy spectrum taken from the surface of the $Fe_{0.2}Co_{0.8}S_2$ material formulation of FIG. 1.

FIG. 2 is a scanning electron microscopy image showing the surface morphology of the iron cobalt disulfide cathode material of the present invention. As shown, the iron cobalt disulfide material comprises a homogenous microstructure having regions of a plate-like planar surface. FIG. 3 illustrates the results of energy dispersive spectroscopy (EDS) analysis that was performed on a portion of the surface of a particle of the material. As the EDS analysis shows, the surface of the iron cobalt disulfide material was identified to comprise the elements of sulfur, cobalt and iron which is in alignment with the x-ray diffraction pattern shown in FIG. 1.

COMPARATIVE EXAMPLE

Material Control Sample

A comparative material sample of iron disulfide (FS) was fabricated and used as a control to the iron cobalt disulfide material described in the previous example. The control sample was synthesized via a solid-state hydrothermal reaction using commercially available iron(II) sulfate heptahydrate ($FeSO_4.7H_2O$) mixed with sodium thiosulfate pentahydrate ($Na_2S_2O_3.5H_2O$) and sulfur (S) in an aqueous solution. The material control sample was devoid of cobalt sulfate to illustrate the attributes of the cobalt dopant used in the previous example. Specifically, iron(II) sulfate heptahydrate ($FeSO_4.7H_2O$) (20.9 g, 0.08 mol) was added to sodium thiosulfate pentahydrate ($Na_2S_2O_3. 5H_2O$) (19.2 g, 0.08 mol) and sulfur (S) (2.5 g, 0.08 mol). This powder was ground to thoroughly mix the components, using a mortar and pestle. After mixing about 400 ml of deionized water was added to the powders to create an aqueous mixture thereof. The aqueous mixture was then positioned in the same sealed vessel and subjected to the same heat treatment as prescribed in Example I. The cathode active control material had the stoichiometric formula of $FeS_2$.

EXAMPLE II

Electrochemical Test Cells

Identical lithium anode electrochemical cells, with the exception of the cathode material, were constructed to test and compare the electrical performance properties of the FCS test cathode active material made according to Example I and the FS control material made according to Comparative Example I. A set of two identical Li/FCS cells were built. Each cell comprised a cast cathode of polyvinylidene fluoride PVDF binder and conductive additives of carbon and graphite contacted to a cathode current collector for each of the materials provided in Example I. An additional set of two Li/FS cells were built, each comprising a cathode of the same formulation as the control iron disulfide cathode material provided in Comparative Example I.

Each cell of the respective sets of cells was discharged at 37° C. under a constant electrical load of 0.5 kΩ for 1 month to 100% depth of discharge (DoD). The cells were each subjected to a pulse train of four 10-second 1335 mA sequential current pulses. Each of the four sequential pulses was separated by a 15 second rest period. The pulse train was administered every 2.5 days resulting in a current density of 15 mA/cm².

Figure 4:
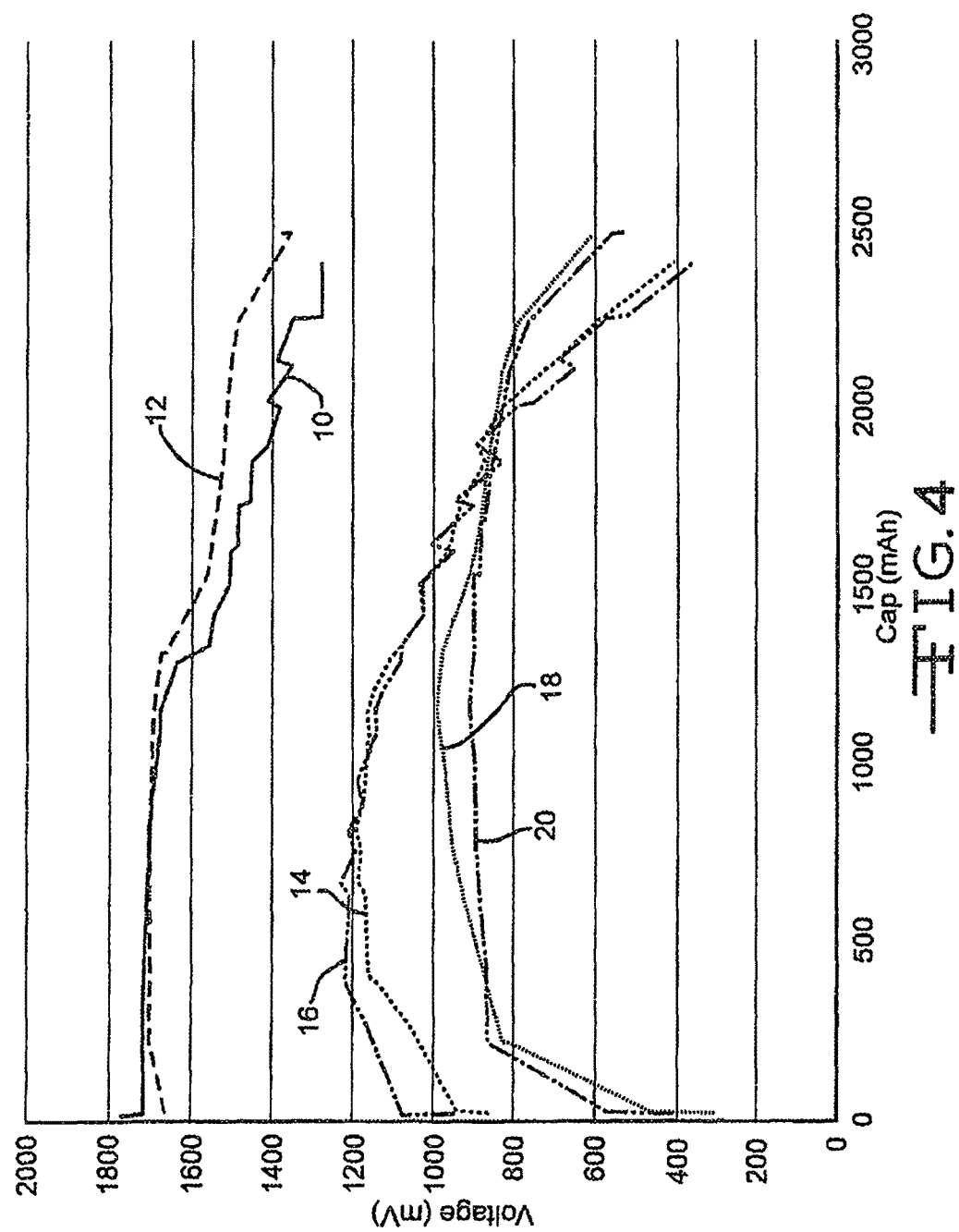
FIG. 4 illustrates the comparative results of depth of discharge testing that was performed on electrochemical cells constructed with a lithium anode and a cathode comprised of an iron disulfide control material in comparison to the iron cobalt disulfide material formulation of the present invention.

FIG. 4 illustrates the results of the depth of discharge testing. The DOD test results shown in FIG. 4 represent the average readings of the cells constructed with cathodes comprising cathode material formulations, $Fe_{0.2}Co_{0.8}S_2$ and control formulation $FeS_2$. Specifically, FIG. 4 shows the average pre pulse or background voltages as curves 10, 12 and the respective average minimum pulse ($P_{min}$) voltages as curves 14, 16, 18, and 20 for each of the two groups of test cells constructed with the respective cathode materials.

Table I below summarizes the DOD test results per cathode formulation while a current pulse was applied. The "Reading" column details the identification number of the current pulse that was measured. For example, P1 corresponds to the first current pulse and P4 is the fourth current pulse of the pulse train applied to the cell. "Loaded Voltage at Capacity Cutoff 500 mAh" details the pulse minimum voltage in millivolts that was exhibited when a cell reached an output capacity of about 500 mAh. "Capacity 1.4V Cutoff" details the P1min and P4min energy capacity measurements (milli Amp hours) that was exhibited when a cell reached an output voltage of about 1.4V. As defined herein, "capacity" is the amount of electrical energy that an electrochemical cell can deliver at a rated voltage.

TABLE I

| Material Formulation | Curve Number | Reading | Voltage (mV) at 500 mAh Capacity | Capacity 1.4 V Cutoff (mAhrs) |
|---|---|---|---|---|
| $FeS_2$ | 12 | Pre pulse | 1,703 | N/A |
| $FeS_2$ | 18 | P1 min | 896 | 1,930 |
| $FeS_2$ | 20 | P4 min | 874 | 1,930 |
| $Fe_{0.2}Co_{0.8}S_2$ | 10 | Pre pulse | 1,718 | N/A |
| $Fe_{0.2}Co_{0.8}S_2$ | 14 | P1 min | 1,167 | 2,375 |
| $Fe_{0.2}Co_{0.8}S_2$ | 16 | P4 min | 1,218 | 2,375 |

As FIG. 4 and Table I illustrate, cells constructed with cathodes comprising the material formulation of $Fe_{0.2}Co_{0.8}S_2$ exhibited a greater rate capability and energy capacity as compared to the control material formulation of $FeS_2$. As detailed in Table I above, at a capacity cutoff of about 500 mAh, cells constructed with a cathode comprising the iron cobalt disulfide of the present invention exhibited under load voltages of about 1,167 mV and about 1,218 mV for the measured P1 and P4 pulse minimums, respectively. In comparison, cells constructed with cathodes comprising the iron disulfide control material exhibited loaded voltages of about 896 mV and 874 mV for the measured P1 and P4 pulse minimums at the 500 mAh capacity cutoff, respectively. This differential in measured voltages at 500 mAh capacity illustrates the increased rate capability realized with the iron cobalt disulfide cathode material of the present invention in comparison to the iron disulfide control material.

Figure 5:
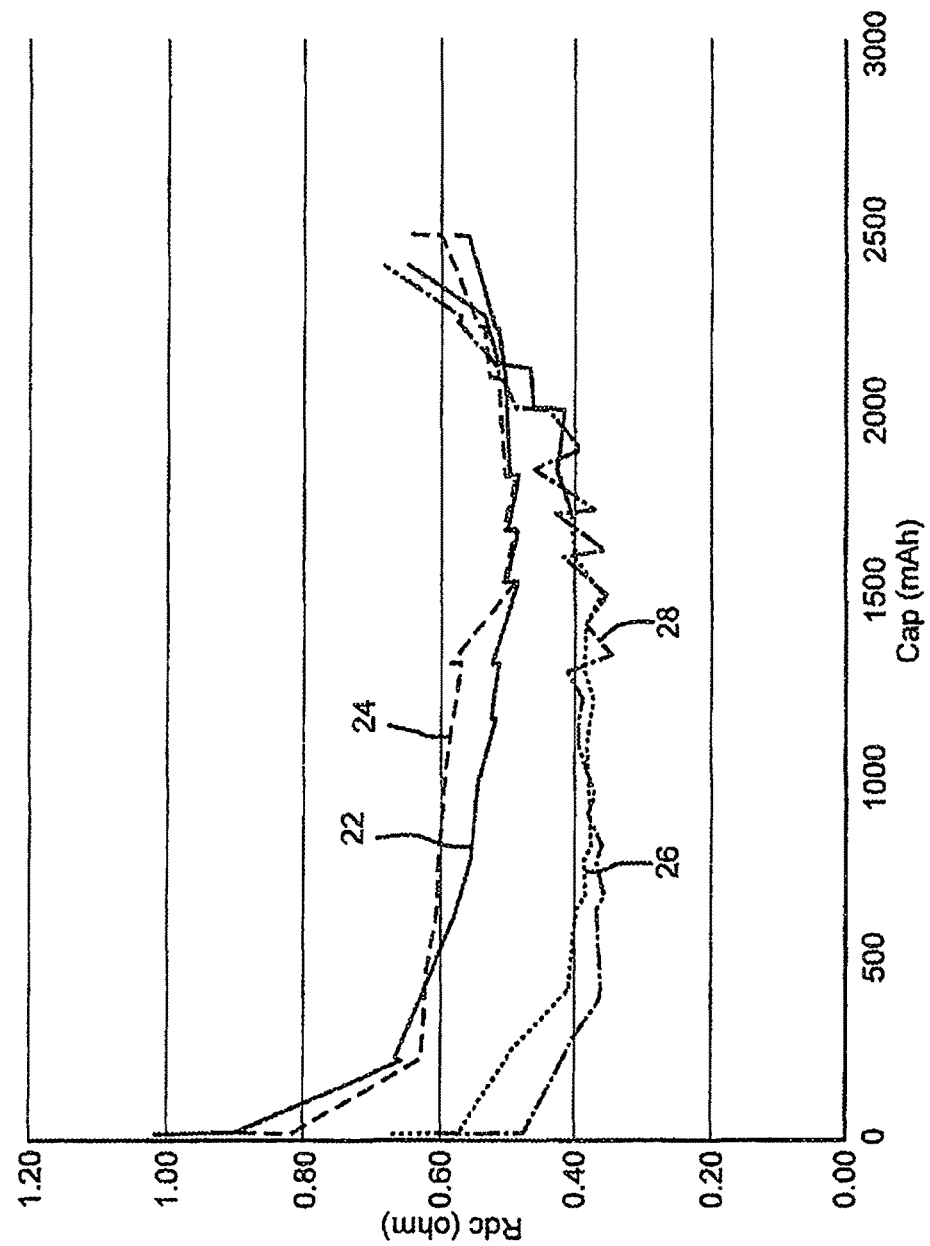
FIG. 5 is a graph showing the measured direct current electrical resistance from the test and control cells of FIG. 4 tested during the depth of discharge testing.

FIG. 5 is a graph illustrating the direct current electrical resistance values that were measured for cells constructed with cathodes comprising either the iron cobalt disulfide material formulation of the present invention or the iron disulfide control material formulation during the depth of discharge testing under the constant electrical load of 0.5 kΩ. Curves 22 and 24 illustrate the measured direct current electrical resistance (Rdc) in ohms of cells constructed with cathodes comprising the iron disulfide ($FeS_2$) control cathode material for pulse train 1 and 4, respectively. Curves 26 and 28 illustrate the measured direct current electrical resistance (Rdc) in ohms of cells constructed with cathodes comprising the preferred iron cobalt disulfide ($Fe_{0.2}Co_{0.8}S_2$) cathode material of the present invention for pulse trains 1 and 4, respectively.

As shown, cells constructed with cathodes comprising the iron cobalt disulfide material of present invention exhibited significantly reduced electrical resistance as compared to the iron disulfide control formulation. For example, at a capacity of about 1,000 mAh, cells comprising the iron cobalt disulfide cathode material exhibited a first pulse Rdc measurement of about 0.39 ohms, whereas cells constructed with the iron disulfide ($FeS_2$) control cathode material exhibited a first pulse Rdc measurement of about 0.55 ohms at the same cell capacity. Thus, cells constructed with the iron cobalt disulfide cathode material of the present invention exhibited a reduction in direct current electrical resistance of about 29 percent as compared to cells constructed with the iron disulfide control material.

Figure 6:
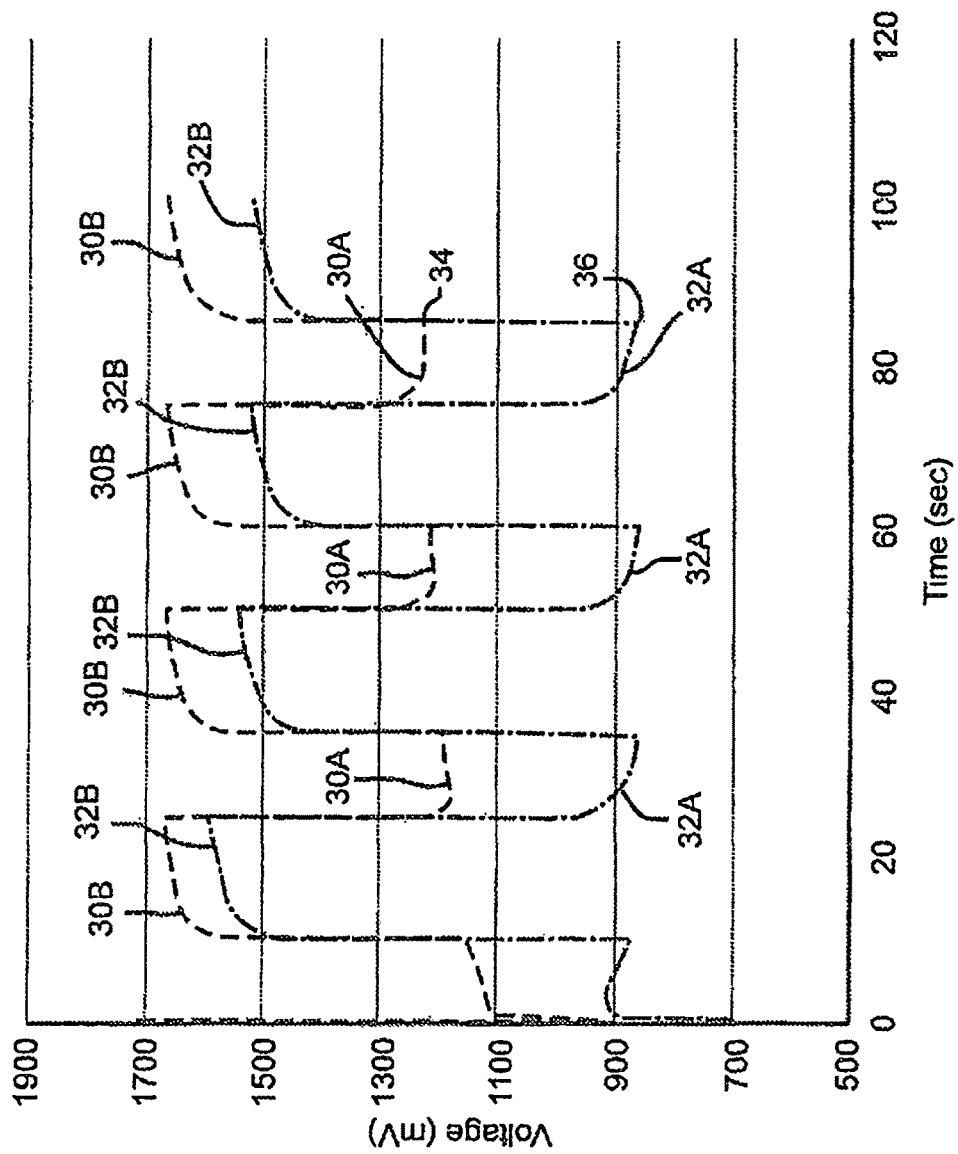
FIG. 6 is a waveform graph illustrating measured voltage in mV vs. time in seconds of the cells of FIG. 4 that were tested during depth of discharge testing.

FIG. 6 shows the measured wave form of cells constructed with the iron cobalt disulfide material of the present invention and iron disulfide control material, respectively, during the depth of discharge testing. Curve 30 illustrates the average voltage profile of cells constructed with cathodes comprising the iron cobalt disulfide composition of the present invention. Curve 32 illustrates the average voltage profile of cells constructed with cathodes comprising the iron cobalt disulfide control cathode material. Curve portions 30A and 32A illustrate measured voltages under pulsed conditions for cells comprising the iron cobalt disulfide cathode material of the present invention and control iron disulfide control material, respectively. Curve portions 30B and 32B illustrate measured voltages during pre-pulse conditions for cells comprising the iron cobalt disulfide cathode material of the present invention and control iron disulfide control material, respectively.

As shown, cells comprising the iron cobalt disulfide cathode material exhibited a significant increase in measured voltage under pulsed conditions (curve portion 30A) as well as during pre-pulse conditions (curve portion 30B) as compared to cells comprising the iron disulfide control cathode material. For example, the voltage at the end of the third pulse for the cell constructed with the iron cobalt disulfide cathode material, point 34 in the graph, was measured to be about 1250 mV. In contrast, the measured voltage for the cell constructed with the iron cobalt disulfide control cathode material under the same testing conditions, point 36 in the graph, was measured to be about 880 mV. Thus, the measured difference in voltage under the same pulsed conditions was about 370 mV, which further indicates the increased rate capability of the iron cobalt disulfide material of the present invention.

Thus, electrochemical cells constructed with a cathode comprising the iron cobalt disulfide material formulation of the present invention were shown to exhibit increased capacity and an improved rate capability. The above detailed description and examples are intended for purposes of illustrating the invention and are not to be construed as limited.

What is claimed is:

1. A method for making a cathode for an electrochemical cell, the comprising the steps of:
   a) mixing:
      i) a first metal salt comprising iron;
      ii) a second metal salt comprising cobalt and sulfur; and
      iii) sodium thiosulfate pentahydrate ($Na_2S_2O_3 \cdot 5H_2O$) as a sodium salt reactant to thereby provide a metal salt matrix admixture;
   b) adding water to the metal salt matrix admixture;
   c) hydrothermally reacting the metal salt matrix admixture to a temperature of about 200° C. to thereby provide the cathode active material having the general formula $Fe_{1-x}Co_xS_2$, wherein $0.5 \leq x \leq 1.0$; and
   d) forming the cathode active material into a cathode.

2. The method of claim 1, including selecting the first metal salt from the group consisting of iron sulfate ($FeSO_4$), iron acetate ($Fe(C_2H_3O_2)_2$), iron bromide ($FeBr_3$), iron perchlorate ($Fe(ClO_4)_2$), iron iodate ($FeI_2$), iron nitrate (($Fe(NO_3)_3$), iron oxalate ($Fe(C_2O_4)_3$), iron thiocyanate ($Fe(SCN)_3$), and respective hydrate forms thereof.

3. The method of claim 1, including selecting the second metal salt from the group consisting of cobalt sulfate ($CoSO_4$), cobalt acetate $Co(C_2H_3O_2)_2$, cobalt chloride ($CoCl_3$), cobalt chloride ($CoCl_2$), cobalt fluoride ($CoF_2$), cobalt iodate ($CoI_2$), cobalt thiocyanate ($Co(SCN)_2$), and respective hydrate forms thereof.

4. The method of claim 1, including providing iron sulfate as the first metal salt and cobalt sulfate and sulfur as the second metal salt.

5. The method of claim 1, wherein the cathode active material comprises a cubic lattice structure having a unit cell dimension of between about 5.383 Å and 5.478 Å.

6. The method of claim 1, wherein the cathode active material is selected from $Fe_{0.3}Co_{0.7}S_2$ and $Fe_{0.2}Co_{0.8}S_2$.

7. The method of claim 1, including mixing a binder material with the cathode active material when forming the cathode.

8. The method of claim 7, wherein the binder material is a fluoro-resin powder.

9. The method of claim 1, including mixing a conductive additive material with the cathode active material when forming the cathode.

10. The method of claim 9, selecting the conductive additive material from the group consisting of carbon, graphite, and a combination thereof.

11. A method for making a cathode for an electrochemical cell, the comprising the steps of:
   a) mixing:
      i) a first metal salt comprising iron sulfate;
      ii) a second metal salt comprising cobalt sulfate and sulfur; and
      iii) a sodium salt reactant to thereby provide a metal salt matrix admixture;
   b) adding water to the metal salt matrix admixture;
   c) hydrothermally reacting the metal salt matrix admixture to provide the cathode active material having the general formula $Fe_{1-x}Co_xS_2$, wherein $0.5 \leq x \leq 1.0$; and
   d) forming the cathode active material into a cathode.

12. The method of claim 11, including adding de-ionized water to the metal salt matrix admixture to thereby provide an aqueous metal salt matrix admixture, and heating the aqueous metal salt matrix admixture to a temperature of from about 100° C. to 300° C.

13. The method of claim 11, wherein the sodium salt reactant is sodium thiosulfate pentahydrate ($Na_2S_2O_3 \cdot 5H_2O$).

14. The method of claim 11, wherein the cathode active material comprises a cubic lattice structure having a unit cell dimension of between about 5.383 Å and 5.478 Å.

15. The method of claim 11, wherein the cathode active material is selected from $Fe_{0.3}Co_{0.7}S_2$ and $Fe_{0.2}Co_{0.8}S_2$.

16. The method of claim 11, including mixing a fluoro-resin binder with the cathode active material when forming the cathode.

17. The method of claim 1, including mixing a conductive additive selected from the group consisting of carbon, graphite, and a combination thereof with the cathode active material when forming the cathode.

18. A method for making a cathode for an electrochemical cell, the comprising the steps of:
- a) mixing:
   - i) a first hydrate of iron sulfate;
   - ii) a second hydrate comprising cobalt sulfate and sulfur; and
   - iii) sodium thiosulfate pentahydrate ($Na_2S_2O_3 \cdot 5H_2O$) as a sodium salt reactant to thereby provide a metal salt matrix admixture;
- b) adding water to the metal salt matrix admixture;
- c) hydrothermally reacting the metal salt matrix admixture to a temperature of from about 100° C. to 300° C. to thereby provide the cathode active material having the general formula $Fe_{1-x}Co_xS_2$, wherein $0.5 \leq x 1.0$; and
- d) forming the cathode active material into a cathode.

19. The method of claim 18, wherein the cathode active material comprises a cubic lattice structure having a unit cell dimension of between about 5.383 Å and 5.478 Å.

20. The method of claim 18, wherein the cathode active material is selected from $Fe_{0.3}Co_{0.7}S_2$ and $Fe_{0.2}Co_{0.8}S_2$.

\* \* \* \* \*